United States Patent [19]

Richter

[11] 3,839,184

[45] Oct. 1, 1974

[54] DEVICE FOR COOLING OF THE CARRIER PHASE IN ELECTROPHORESIS

[75] Inventor: Axel William Gottfrid Richter, Malmo, Sweden

[73] Assignee: AB Analysteknik, Vallentuna, Sweden

[22] Filed: July 10, 1973

[21] Appl. No.: 377,905

[30] Foreign Application Priority Data

July 12, 1972 Sweden .............................. 9165/72

[52] U.S. Cl. .......... 204/299, 204/180 S, 204/180 G

[51] Int. Cl. .............................................. B01k 5/00

[58] Field of Search ............. 204/180 G, 180 S, 299

[56] References Cited

UNITED STATES PATENTS

| | | | |
|---|---|---|---|
| 3,494,846 | 2/1970 | Arquembourg | 204/180 G |
| 3,563,880 | 2/1971 | Anderson | 204/180 G X |
| 3,616,456 | 10/1971 | Valmet | 204/299 |
| 3,677,930 | 7/1972 | Mesbane et al. | 204/299 |

*Primary Examiner*—John H. Mack
*Assistant Examiner*—A. C. Prescott
*Attorney, Agent, or Firm*—Fleit, Gipple & Jacobson

[57] ABSTRACT

A device for cooling of a carrier plate in an electrophoresis cell is disclosed. Said cooling device gives an efficient and uniform cooling of the whole surface of the carrier plate using a minimum of cooling liquid and at very low cooling liquid pressure. Said cooling device comprises a cooling plate which rests loosely on a drained box and a distribution device for cooling liquid in the drained box, the improvement being that the distribution device consists of distribution plates with slits therebetween, containers for cooling liquid under these plates, a distribution pipe in each container and a supplying pipe for cooling liquid to each container.

2 Claims, 2 Drawing Figures

PATENTED OCT 1 1974 3,839,184

DEVICE FOR COOLING OF THE CARRIER PHASE IN ELECTROPHORESIS

Figure 1:
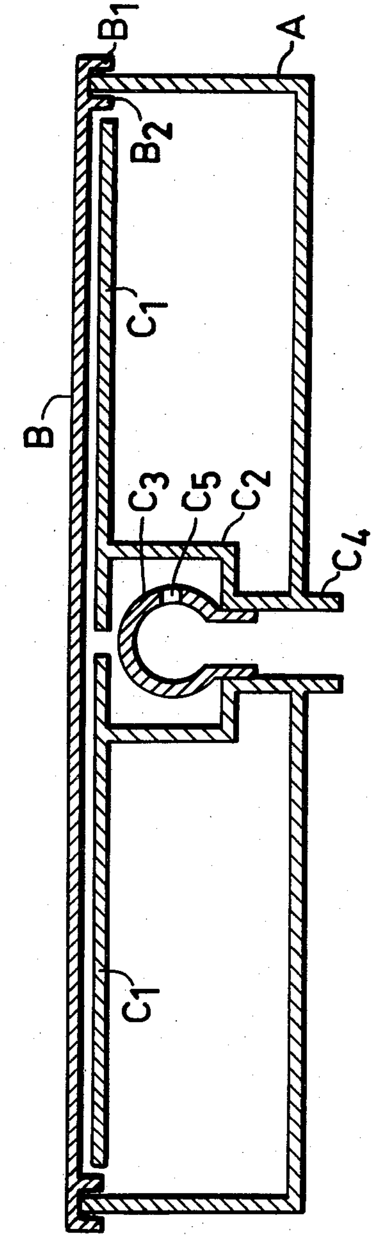

The present invention relates to a method and a device for cooling of the carrier phase in electrophoresis.

A number of different processes for cooling of the carrier phase in electrophoresis are known. For instance in the Swedish Pat. No. 225,029 a process is disclosed, wherein a cooling liquid is fed under pressure into a pipe coil located under the carrier phase and through a plurality of small holes made in the coil with equal distance to each other and is brought to spray upwardly towards the plate, on which the carrier phase is resting.

Except for the Swedish Pat. No. 225,029 all known processes operate according to any of the two following principles.

I. The heat developed in the carrier phase during the electrophoresis is dissipated via a plate of electrically isolating material to a stationary liquid located under this plate, which in its turn is coooled by cooling coils placed in the liquid.

II. The heat developed in the carrier phase during the electrophoresis is dissipated via a plate of electrically isolating material to a cooling medium flowing in channels under the isolating plate.

The first process described above provides uniform cooling over the whole surface but very bad dissipation of heat.

The second process described above does not provide uniform cooling over the whole surface, as the cooling medium flows in a channel system, and therefore the heat is less dissipated in the parts of the carrier phase resting on the walls of the channel system than in the parts resting directly above the channel, where the cooling medium is flowing.

In the process according to the Swedish Pat. No. 225,029 an effective and uniform cooling is obtained over the whole surface of the carrier phase, but the system requires for its function a high pressure in the cooling medium and consumes great amounts thereof. The high pressure cannot always be easily obtained and at leakage there will be greater possibilities for the cooling liquid to penetrate to areas that are not beeing cooled. As high voltages are used in electrophoresis, this may be dangerous.

The present invention relates to a process and a device for cooling the carrier phase in electrophoresis, where these disadvantages have been eliminated. By the process it is possible to achieve an efficient and uniform cooling of the whole surface of the carrier phase using a minimum of cooling medium and also at a very low pressure therein.

The process of the present invention relates to cooling of a plane, horizontal carrier plate in an electrophoresis cell, which rests on a cooling plate with at least one rim around the plate, the latter resting loosely on a draining box, and is characterized in that a cooling liquid is fed under pressure into one or more containers located under the cooling plate, which containers are adapted under at least two distribution plates along their whole length, and is carried through a slit between these distribution plates, said cooling liquid being brought to flow under the cooling plate in contact with this, on which the carrier phase to be cooled is resting, the distance between the underside of the cooling plate and the upper sides of the distribution plates being automatically adapted to the pressure prevailing in the cooling medium, said cooling medium being brought to fill at constant pressure the space between the upper sides of the distribution plates and the underside of the cooling plate completely under continuous flow against the rim around the cooling plate.

The device according to the present invention consists of a drained box for collection of cooling liquid, a cooling plate with at least one rim around the plat and a distribution device for the cooling liquid adapted in the drained box, and is characterized in that the distribution device consists of at least two distribution plates with slits between the plates, one or more containers for cooling liquid, which are permanently adapted under the distribution plates at the slits and along the whole length of the plates, a distribution pipe, which is adapted in each container for cooling liquid and which has the same length as these, and a supply pipe for cooling liquid to each container.

Instead of a slit between the distribution plates one can have several slits, through which cooling liquid is fed. The width of the slits can vary, but they are preferably made so wide that they are not clogged by impurities in the cooling liquid. Suitable slit widths are about 1 to 4 mm. The distance between the distribution plates and the cooling plate is preferably up to 2 mm.

The cooling liquid can be drained from the underside of the cooling plate through an overflow rim, adapted on the underside of the cooling plate and outside the upper sides of the distribution plates and completely surrounding these.

Figure 2:
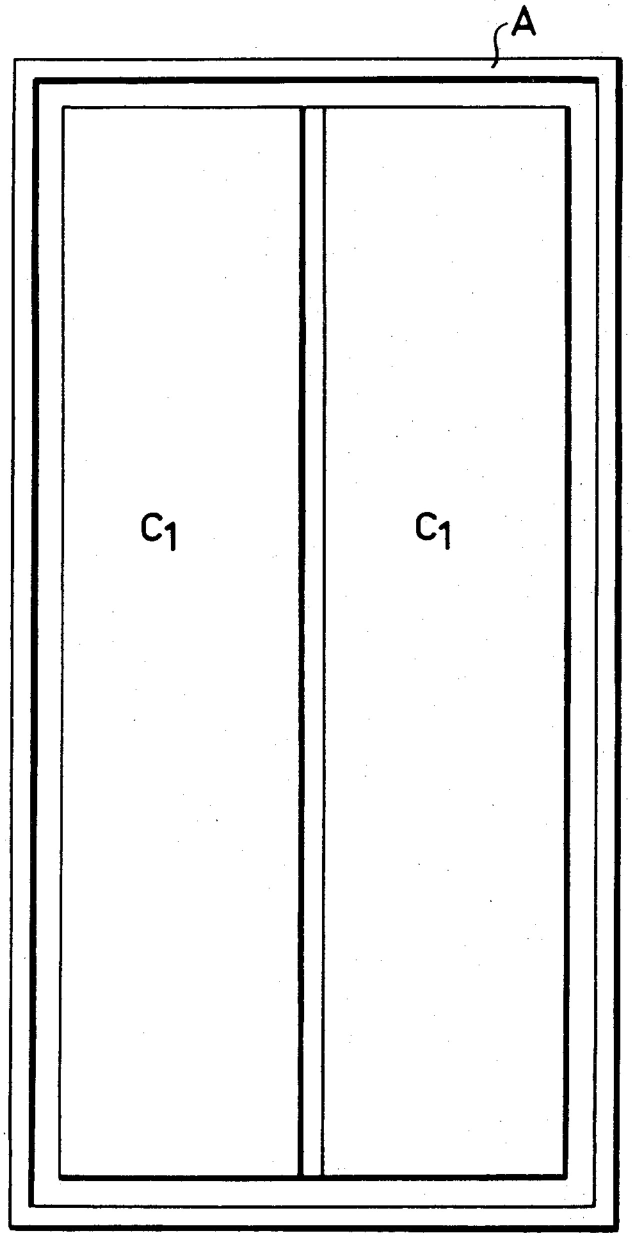

The present invention is illustrated more in detail by the accompanying drawings, of which FIG. 1 is a cross-sectional view of the device and FIG. 2 is a top view of the distribution.

In FIG. 1 an embodiment of the present invention is shown, in which A designates a drained box (in which the drainage is not illustrated), for collection of cooling liquid, B is a cooling plate with one outer and one inner rim $B_1$ and $B_2$ respectively around the cooling plate and C is a distribution device for cooling liquid, which is adapted in the drained box A and which consists of two distribution plates $C_1$ with a slit between them, a container $C_2$ for cooling liquid, and which is permanently adapted under the two distribution plates $C_1$ along their whole length, a distribution pipe $C_3$, which is adapted inside the container $C_2$ for cooling liquid and which has the same length as this, and a supply pipe for cooling liquid $C_4$.

In the distribution pipe $C_3$ a number of obliquely downwardly directed outlet holes $C_5$ are bored, and the diameter of these holes is preferably 2–5 mm.

The cooling device according to the present invention functions in such a manner that the cooling liquid, e.g., tap water or thermostated water is fed under pressure into the supply pipe $C_4$ out through the distribution pipe $C_3$ to the container $C_2$ for cooling liquid, which is filled and from there the cooling liquid is pressed out through the slit between the two distribution plates $C_1$. The carrier phase rests on the cooling plate B, from which the heat developed during the electrophoresis is to be dissipated. As the cooling plate B with surrounding rims rests loosely on the drainage box A, the former will be lifted by the incoming cooling liquid, which will fill the whole space arising between the distribution plates and the cooling plate. The distance between the distribution plates and the cooling plate will thus be dependent on the pressure of the cooling liquid. If the pressure increases also the distance between the distribution plates and the cooling plate will increase and vice versa. The cooling liquid will thus pass between the cooling plate and the distribution plates and flow towards the rim around the cooling plate in a thin, uniform layer, after which it is collected in the drainage box A, from which it is then drained in a suitable manner.

The cooling device used with the process according to the present invention is very simple as compared with previously known cooling devices, and the different parts thereof can be made of suitable materials. The drainage box can for instance be made of some electrically non-conductive material, such as plastic or glass, the cooling plate of some heat conductive, electrically non-conductive material, such as glass, ceramics, plastic or metal isolated by plastic coating, and the distribution device of metal, plastic, glass and the like. Different parts of the distribution device can be made of different materials. All this contributes to essentially lower manufacturing costs. Thanks to the fact that the cooling liquid can be supplied at a fairly low pressure, the consumption of cooling liquid per time unit will be considerably less, and the cooling is unifom over the whole surface to be cooled. Due to the design of the cooling system it is also less sensitive to disturbances, such as clogging, as compared with known cooling systems.

What is claimed is:

1. A device for cooling of a plane, horizontal carrier plate in an electrophoresis cell, which rests on a cooling plate with at least one rim around the cooling plate, and this cooling plate rests loosely on a drained box for collecting of cooling liquid, and with a distributing device for cooling liquid adapted in the drained box, characterized in that the distribution device consists of at least two distribution plates with slits between the plates, one or more containers for cooling liquid, which are permanently adapted under the distribution plates at the slits and along the whole length of the plates, a distribution pipe adapted in each container for cooling liquid and of the same length as these and a supply pipe for cooling liquid to each container.

2. A device according to claim 1 characterized in that a number of outlet holes with a direction obliquely downwards are bored in the distribution pipes.

* * * * *